Patented Apr. 17, 1951

2,549,710

UNITED STATES PATENT OFFICE 2,549,710

MANUFACTURE OF DERIVATIVES OF DI-SUBSTITUTED METHANE COMPOUNDS

Gordon James Pritchard, Halewood, Liverpool, England, assignor to Ward Blenkinsop & Company Limited, London, England, a company of Great Britain No Drawing. Application June 23, 1947, Serial No. 756,562. In Great Britain October 30, 1945

Section 1, Public Law 690, August 8, 1946
Patent expires October 30, 1965

3 Claims. (Cl. 260—433)

This invention is concerned with improvements in and relating to the manufacture of derivatives of di-substituted methane compounds.

British Patent No. 547,564 describes the preparation for medical and like uses of substances obtained by combining certain di-substituted methane compounds with bactericidal and/or physiologically useful organic bases or with the hydrate or oxide of one or more of the metals zinc, bismuth, copper and mercury so as to form salts. A further development of this work was described in British Patent No. 552,751 which discloses the preparation of silver and/or lead derivatives of similar disubstituted methane compounds.

As a still further development of this work, U. S. application Serial No. 756,563, filed June 23, 1947 describes a process for the production of a series of new and valuable derivatives of compounds of the general formula $R_1$—$CH_2$—$R_2$ (which compounds are in said application and herein referred to as "D. S. M. compounds"), in which $R_1$ and $R_2$, which may either be identical or different, are chosen from the anionic residues of the following classes of substances:

A phenol sulphonic acid,
An alkyl phenol sulphonic acid,
A carboxyl phenol sulphonic acid,
A diphenyl or alkyl diphenyl mono- or disulphonic acid,
A benzene sulphonic acid,
A sulpho benzoic acid,
A naphthalene or alkylnaphthalene mono- or disulphonic acid,
A naphthol or alkyl naphthol sulphonic acid, or
A nuclear substituted halogen derivative of any of the above substances.

These substances are in the present specification referred to as "aryl sulphonic acids."

Said application Serial No. 756,563 describes the preparation of new and useful products by causing a D. S. M. compound to react with an organometallic compound of the general formula $R_3MA$ where $R_3$ is an alkyl, aryl, aralkyl or heterocyclic radicle, which may or may not be substituted with neutral, acidic or basic substituents, M is a polyvalent metal, preferably mercury or arsenic, and A is an acidic radicle, such as halide, nitrate, acetate or hydroxide or oxide and of such a nature that the compound will react with the D. S. M. compound, and irrespective of whether the said group is or is not split off in the process of the formation of the D. S. M./organometallic compound. It was also there stated that the reaction which occurs appears to be one of salt formation, which could be represented by one or other of the following two equations, in which $R_4$—$SO_3H$ has been written for $R_1$ and $R_5.SO_3H$ for $R_2$:

$HO_3S$—$R_4CH_2$—$R_5$—$SO_3H + 2R_3MA =$
    $R_3M$—$O_3S$—$R_4$—$CH_2$—$R_5$—$SO_3MR_3 + 2HA$ or $HO_3S$—$R_4$—$CH_2$—$R_5$—$SO_3H + 2R_3MA =$
    $R_3MA.HSO_3$—$R_4$—$CH_2$—$R_5$—$SO_3H.R_3MA$

I have now found that compounds similar to those described in any of the above mentioned specifications can conveniently be prepared by an alternative method.

According to the present invention therefore I provide a process for the preparation of derivatives of disubstituted methane compounds by causing formaldehyde to react with a salt formed from an aryl sulphonic acid as above defined and an organo-metallic compound of the general formula $R_3MA$ where $R_3$ is an alkyl radicle or an aryl, aralkyl or heterocyclic radicle, which may or may not be substituted with neutral, acidic or basic substituents, M is a polyvalent metal, preferably mercury or arsenic and A is an acidic radicle such as halide, nitrate, acetate or hydroxide or oxide and of such a nature that the compound will react with the D. S. M. compound, and irrespective of whether the said group is or is not split off in the process of the formation of the salt.

The process may be carried out in various ways and it is not limited to the aryl sulphonic acid salt being either isolated or preformed before introduction of the formaldehyde.

Thus I may either start with a solution in water or other suitable solvent of the preformed aryl sulphonic acid salt and cause the latter to react with formaldehyde or alternatively the components of the salt, i. e. the selected aryl sulphonic acid and the organometallic compound may be added to water or other suitable solvent and the formaldehyde introduced either before or after either or both of the said components.

Whichever method is adopted the reaction may be brought about in any convenient manner, such, for example, as by heating either with/or without the addition of a suitable condensing agent.

Although I generally use either the preformed salt or equivalent quantities of its components, and the invention of course comprises the production of the new substance in solid form, it is sometimes desirable to have present an excess of one or other of the components, as for example for the purpose of modifying the solubility or pH of the product, and such excess may be added either before, during or after the condensation, as desired. It is, moreover, generally desirable to have an excess of formaldehyde present, this excess being eliminated during, or after the completion of the condensation.

The present reaction can be represented by the following equations which represent the case in which a compound of an organometallic compound with only one sulphonic acid, represented as $R_4$—$SO_3H$ is used:

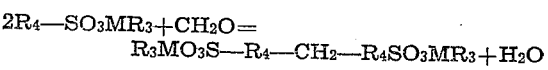

or

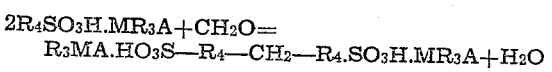

It will be seen that in this case the resulting D. S. M. organometallic derivative will be of the type in which $R_1$ and $R_2$ as above defined are identical.

If however a mixture of two different sulphonic acids $R_4SO_3H$ and $R_5SO_3H$ be used to form the desired salts, then the condensation will lead to a mixture of three substances one of which will be identical with one or other of the two resulting products represented above, the others having either one or both the radicles $R_4$ replaced by $R_5$.

In many cases it will be desirable to prepare the derivatives of D. S. M. compounds in the form of a solution of the salt in an excess of the D. S. M. compound.

I prefer in general to use such organometallic compounds as have valuable bactericidal, fungicidal, insecticidal or other useful properties and I have found that the products obtained according to the invention can be used with advantage for many purposes such for example as in agriculture, horticulture, in the textile industry, the preservation of timber and the like, as well as in medicine and pharmacy.

In order to facilitate a better understanding of the invention, the following examples of how it may be carried out are given only as illustrations.

*Example 1*

20.8 parts by weight of naphthalene-2-sulphonic acid (10 equivalents) are fused at 100° C. and 3.36 parts by weight of phenyl mercuric acetate (1 equivalent) are slowly fed into the melt with stirring; this dissolves and acetic acid vapour is given off, 4.25 parts by weight of formaldehyde 40% solution (10.16 equivalents) are then added in three portions over one hour and the reaction mixture heated for 6 hours at 100°, until the smell of formaldehyde has disappeared; the resulting solution of phenyl mercury syntan in the D. S. M. compound derived from naphthalene-2-sulphonic acid may be diluted with 100 parts by weight of water and neutralised to the desired pH by the addition of sodium hydroxide.

*Example 2*

3.36 parts by weight of phenyl mercury acetate were dissolved in 200 parts by weight of warm ethyl alcohol and a solution of 2.08 parts by weight naphthalene-2-sulphonic acid in 20 parts by weight of water was added, 1 part by weight of 40% formaldehyde was added and the whole allowed to stand for 24 hours. At the end of this time a further 1 part by weight of formaldehyde was added and the reaction mixture gently warmed on the water-bath until the smell of formaldehyde had disappeared, the alcohol was then evaporated and the phenyl mercury complex separated as a whitish powder.

Found: Hg 43.1%
$C_{33}H_{24}O_6S_2Hg_2$ the true salt requires Hg=40.9%
$C_{45}H_{36}O_8S_2Hg_4$ the basic salt requires Hg=51.1%

Alternatively 3 parts by weight of phenyl mercury acetate was dissolved in 2000 parts by weight of water and 1.8 parts naphthalene-2-sulphonic acid was added, the whole was then treated with 2 parts by weight of 40% formaldehyde solution, after standing 24 hours the whole was boiled to remove excess formaldehyde and was then diluted with water to give 3,500 parts by weight of solution.

*Example 3*

28.8 parts (20 equivalents) by weight of naphthalene-2; 7-di-sulphonic acid were fused at 100° C. and 3.36 parts by weight of phenyl mercury acetate (1 equivalent) were gradually fed into the melt with stirring. This dissolved with evolution of acetic acid vapour. 8.5 parts (22.6 equivalents) of formaldehyde 40% solution was then added in five portions in about one hour and the mixture heated at 100° for 6.5 hours, when the smell of formaldehyde had disappeared.

The salt mixture was diluted with 200 parts water and the pH adjusted by addition of sodium hydroxide.

I claim:

1. A process for the preparation of derivatives of disubstituted methane compounds which comprises reacting formaldehyde with a salt formed from a sulphonic acid selected from the group consisting of phenol sulphonic acids, alkyl phenol sulphonic acids, carboxyl phenol sulphonic acids, diphenyl and alkyl diphenyl mono- and disulphonic acids, benzene sulphonic acids, sulphobenzoic acids, naphthalene and alkyl naphthalene mono- and disulphonic acids, naphthol and alkyl naphthol sulphonic acids and nuclear substituted halogen derivatives of said acids, and an organometallic compound of the general formula $R_3MA$ where R is a hydrocarbon radical, M is mercury and A is a univalent anion.

2. The process defined in claim 1 in which a solution is made comprising formaldehyde, the sulphonic acid and the organometallic compound which compounds are reacted together in said solution.

3. The process defined in claim 1 in which $R_3$ is phenyl.

GORDON JAMES PRITCHARD.

REFERENCES CITED

The following references are of record in the file of this patent:

UNITED STATES PATENTS

| Number | Name | Date |
|---|---|---|
| 1,986,044 | Casaburi | Jan. 1, 1935 |
| 2,131,008 | Hibben | Sept. 20, 1938 |
| 2,140,878 | Lurie | Dec. 20, 1938 |
| 2,215,457 | Andersen | Sept. 24, 1940 |
| 2,326,578 | Thuau | Aug. 10, 1943 |

FOREIGN PATENTS

| Number | Country | Date |
|---|---|---|
| 547,564 | Great Britain | Sept. 2, 1942 |
| 552,751 | Great Britain | Apr. 22, 1943 |